United States Patent [19]

Hirano et al.

[11] Patent Number: 4,973,958

[45] Date of Patent: Nov. 27, 1990

[54] KEYLESS ENTRY SYSTEM FOR AUTOMOTIVE DEVICES ANTENNA DEVICE ALLOWING LOW POWER RADIO SIGNAL COMMUNICATION

[75] Inventors: Motoki Hirano, Yokohama; Mikio Takeuchi; Kinichiro Nakano, both of Zama, all of Japan

[73] Assignee: Nissan Motor Company, Limited, Yokohama, Japan

[21] Appl. No.: 831,526

[22] Filed: Feb. 21, 1986

[30] Foreign Application Priority Data

Feb. 21, 1985 [JP] Japan .................................. 60-33878

[51] Int. Cl.[5] ...................... G08C 19/00; H02K 44/00

[52] U.S. Cl. ............................ 340/825.690; 307/10.2; 340/825.72; 361/172

[58] Field of Search ........................ 340/825.3–825.34, 340/825.69, 825.72, 63, 64; 364/705, 706; 235/380, 382, 382.5; 307/10.2; 361/172; 70/252, 257; 455/77, 88, 272–286

[56] References Cited

U.S. PATENT DOCUMENTS 3,196,440 7/1965 Weinstein .................. 340/825.72 X
3,587,051 6/1971 Hovey .
3,593,816 7/1971 Kazaoka .
3,633,167 1/1972 Hedin .
3,641,396 2/1972 Kossen et al. .
3,656,098 4/1972 Duren et al. .
3,670,275 6/1972 Kalliomaki et al. .
3,697,943 10/1972 Andres .
3,703,714 11/1972 Andrews .......................... 340/64 X
3,710,316 1/1973 Kromer ................................ 340/63
3,723,967 3/1973 Atkins et al. .
3,751,718 8/1973 Hanchett, Jr. .
3,754,164 8/1973 Zorzy .
3,754,213 8/1973 Morroni et al. .
3,764,859 10/1973 Wood et al. .
3,781,854 12/1973 Kaufman et al. .
3,812,403 5/1974 Gartner .
3,830,332 8/1974 Fontaine .
3,831,065 8/1974 Martin et al. .
3,859,624 1/1975 Kriofsky et al. .
3,866,168 2/1975 McGuirk, Jr. .
3,871,474 3/1975 Tomlinson et al. .
3,878,511 4/1975 Wagner .
3,885,408 5/1975 Clark, Jr. ............................ 70/278
3,891,980 6/1975 Lewis et al. .............. 340/825.31 X
3,953,769 4/1976 Sopko .
4,004,273 1/1977 Kalogerson .
4,100,534 7/1978 Shifflet, Jr. .
4,114,147 9/1978 Hile .................................... 340/528
4,129,855 12/1978 Rodrian .
4,137,985 2/1979 Winchell .
4,142,097 2/1979 Ulch .................................. 235/382
4,143,368 3/1979 Route et al. ........................ 340/543
4,148,092 4/1979 Martin ................................ 361/172
4,160,240 7/1979 Partipilo .
4,189,712 2/1980 Lemelson .
4,196,347 4/1980 Hadley ............................... 455/603
4,205,300 5/1980 Ho et al. .
4,205,325 5/1980 Haygood et al. .
4,206,491 6/1980 Ligman et al. ...................... 361/172
4,222,088 9/1980 Burton ............................... 361/172
4,223,296 9/1980 Kim et al. .
4,232,354 11/1980 Mueller et al. ...................... 361/172

(List continued on next page.)

*Primary Examiner*—Ulysses Weldon
*Attorney, Agent, or Firm*—Foley & Lardner, Schwartz, Jeffery, Schwaab, Mack, Blumenthal & Evans

[57] ABSTRACT

A keyless entry system employs a pocket-portable radio signal transmitter to be carried by a user and a controller mounted on a vehicle and associated with a vehicle device, such as a door lock mechanism, a trunk lid opener, a window regulator, a steering lock device and so forth, to be operated. Radio signal communication between the transmitter and the controller is performed by electromagnetic induction. According to the present invention, electromagnetic induction is caused between antennas in the transmitter and the controller. In order to provide wide communication area, at least the antenna of the controller serves as a transformer to generate higher loop current for generating sufficiently strong magnetic field therearound.

19 Claims, 7 Drawing Sheets

U.S. PATENT DOCUMENTS 4,233,642 11/1980 Ellsberg .............................. 361/172
4,240,516 12/1980 Henderson et al. ................ 180/289
4,249,161 2/1981 Mohnhaupt .
4,249,245 2/1981 Nakanishi et al. .................. 364/710
4,291,237 9/1981 Kitano .................................. 307/10
4,309,674 1/1982 Owen ................................... 332/18
4,317,157 2/1982 Eckloff ................................ 361/172
4,327,255 4/1982 Suszylo .
4,332,305 6/1982 Kocolowski ........................ 180/271
4,354,189 10/1982 Lemelson ...................... 340/825.31
4,388,524 6/1983 Walton ................................ 235/380
4,418,416 11/1983 Lese et al. ............................... 375/5
4,447,808 5/1984 Marcus .
4,450,431 5/1984 Hochstein .
4,471,343 9/1984 Lemelson ............................ 340/571
4,473,825 9/1984 Walton ........................... 340/825.54
4,477,806 10/1984 Mochida et al. .............. 340/825.32
4,479,255 10/1984 Geesen et al. ...................... 455/246
4,486,806 12/1984 Mochida et al. .................... 361/172
4,509,093 4/1985 Stellberger .......................... 361/172
4,511,946 4/1985 McGahan ........................... 361/172
4,535,333 8/1985 Twardowski ................. 340/825.69
4,550,444 10/1985 Uebel .................................... 455/41
4,554,542 11/1985 Dolikian ........................ 340/825.76
4,578,314 3/1986 Ohta et al. .
4,595,902 6/1986 Proske et al. .
4,598,275 7/1986 Ross et al. ........................... 340/573
4,619,002 10/1986 Thro .................................. 455/226
4,630,044 12/1986 Polzer ............................ 340/825.72
4,670,746 6/1987 Taniguchi et al. ............. 340/825.31
4,672,375 6/1987 Mochida et al. .
4,688,036 8/1987 Hirano et al. .
4,703,714 11/1987 Bajka et al. ........................... 118/57

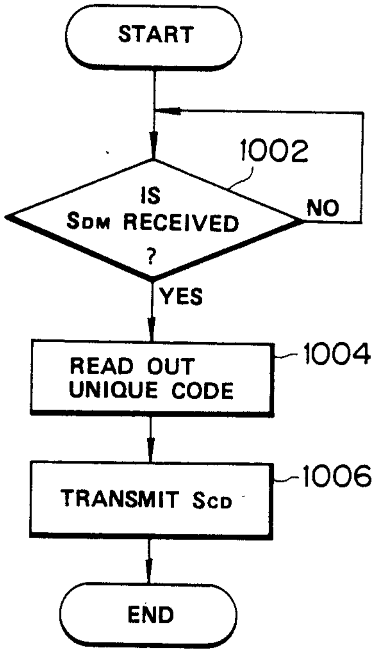
FIG. 6
FIG. 7
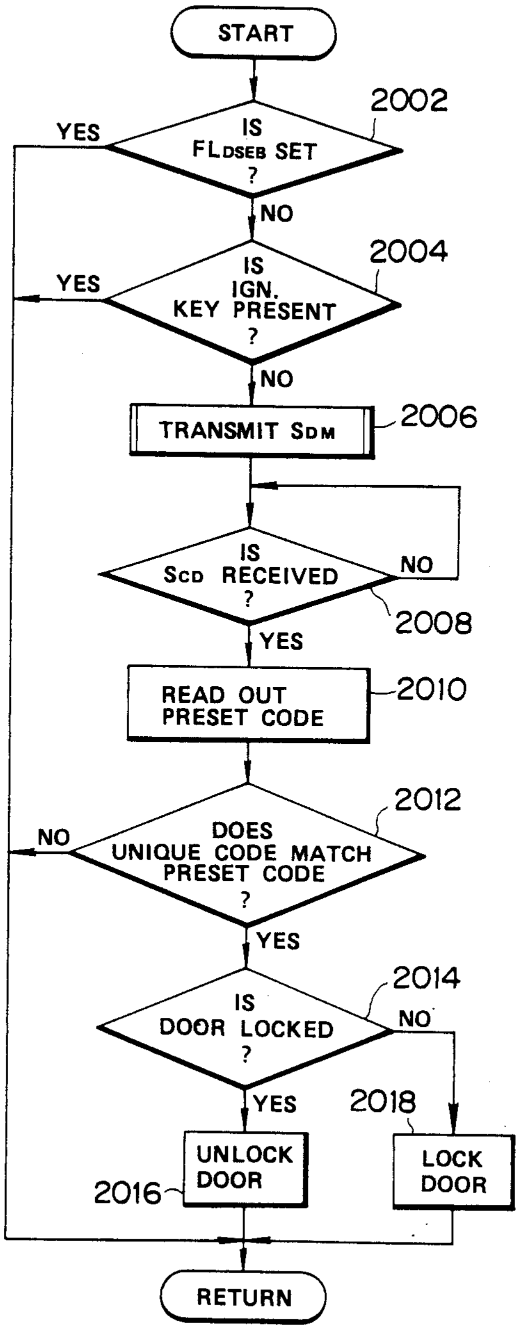

KEYLESS ENTRY SYSTEM FOR AUTOMOTIVE DEVICES ANTENNA DEVICE ALLOWING LOW POWER RADIO SIGNAL COMMUNICATION

BACKGROUND OF THE INVENTION

The present invention relates generally to a keyless entry system for operating vehicular devices, such as a door lock device, a window regulator, a steering lock device, a trunk lid opener and so forth, without using a conventional mechanical key, such as an ignition key. More specifically, the invention relates to a keyless entry system which controls the aforementioned vehicular devices through a radio signal transmitted from a pocketable transmitter.

In the recent years, there have been proposed and developed various systems conveniently operating the vehicular devices without using the conventional mechanical keys, such as ignition keys.

One approach to a convenient vehicular device operating system has been which disclosed in the U.S. Pat. No. 4,205,325, to Haygood et al. Haygood et al discloses a keyless entry system for an automotive vehicle permitting a plurality of operations to be achieved from outside of the vehicle by one who is knowledgeable of preset digital codes. Functions such as unlocking the vehicle doors, opening the trunk lid, opening windows, operating the sun-roof or programming the system with a user-preset digital access code can all be performed by proper sequential operation of a digital keyboard mounted on the outside of the vehicle.

This and other conventional keyless entry systems require the user to accurately input the preset code through the keyboard. Although such keyless entry systems have been well developed and considered useful for eliminating the need for mechanical keys, a serious problem may occur when the user of the vehicle forgets the preset code. If the user is outside of the vehicle and the vehicle door lock device is holding the door locked, the user cannot unlock the door lock until he remembers the preset code.

In order to resolve this defect in the prior art and allow convenient use of the keyless entry system, there has been proposed a new approach in which a pocket-portable wireless transmitter, of a size comparable to a credit card and thus capable of being carried in clothing pockets, is used to identify users authorized to operate vehicle devices. The wireless transmitter always becomes active in response to operation or depression of any one of several push buttons to operate a desired vehicle device. This means that whoever possesses the transmitter has full access to the vehicle and that whenever the transmitter is near enough to the vehicle, keyless entry is possible for any one at all. As a result, if the user should lock the transmitter in the vehicle and leave the vehicle, anyone would be able to unlock the door, turn on the starter motor and steal the vehicle. In addition, it would be highly likely for items stored in the trunk and/or glove box to be stolen when transmitter is left in the vehicle.

In such prior proposed pocket-portable wireless transmitter type keyless entry systems, it is necessary to provide means for conserving the power used in radio communication in order to prolong the life of the battery in the transmitter. However, a relatively low power communication system greatly limits the range of radio signal communications.

SUMMARY OF THE INVENTION

Therefore, it is a principle object of the present invention to provide a keyless entry system with a larger transmission range.

Another and more specific object of the present invention is to provide a keyless entry system with an antenna device which allows low-power, long-range radio communication.

In order to accomplish the aforementioned and other objects, a keyless entry system, according to the present invention, employs a pocket-portable radio signal transmitter to be carried by a user and a controller mounted on a vehicle and associated with a vehicle device, such as a door lock mechanism, a trunk lid opener, a window regulator, a steering lock device and so forth, to be operated. Radio signal communication between the transmitter and the controller is performed by electromagnetic induction. According to the present invention, electromagnetic induction is caused between antennas in the transmitter and the controller. In order to provide wide communication area, at least the antenna of the controller serves as a transformer to generate higher loop current for generating sufficiently strong magnetic field therearound.

In practice, according to the invention, radio transmission between the transmitter and the controller is assured with an area of 2m distance between the controller and the transmitter.

According to one aspect of the invention, a keyless entry system comprises a manual switch, a pocket-portable transmitter transmitting a radio signal indicative of an unique code which identifies the transmitter, in response to a demand in the form of a radio signal, a receiver/controller means transmitting a demand indicative radio signal to the transmitter in response to operation of the manual switch, receiving the unique code-indicative radio signal from the transmitter, comparing the unique code indicated by the received signal with a preset code, and producing a control signal when the unique code matches the preset code, the receiver/controller means including an antenna device for receiving the unique code-indicative radio signal by electromagnetic induction and having a first segment susceptible to electromagnetic induction and a second segment having substantially lower impedance than the first segment and coupled with the first segment for generating a magnetic field sufficiently intense to cause electromagnetic induction and so transmit the demand indicative radio signal to the transmitter, and an electrically operable actuator associated with the receiver/controller circuit and with an object device to be operated, and responsive to the control signal to operate the object device to perform a desired operation.

The first and second segments comprise first and second loop coils, which second loop coil has substantially fewer turns than the first loop coil. The first and second loop coils are coupled by inductive coupling. The antenna device is adapted to generate a magnetic field at a strength of 120 dB $\mu$/m within an area of not more than 2m from the antenna device. The second loop coil has one-tenth the number of turns of the first loop coil.

According to another aspect of the invention, a keyless entry system for operating an automotive vehicle devices, comprises a manual switch mounted on an external surface of the vehicle body and accessible from outside the vehicle, a pocket-portable transmitter, to be carried by a user of the vehicle, for transmitting a radio signal indicative of an unique code which identifies the transmitter in response to a demand in the form of a radio signal, a receiver/controller means, mounted on the vehicle and electrically connected to the manual switch, for transmitting a demand-indicative radio signal to the transmitter in response to manual operation of the manual switch, receiving the unique code-indicative radio signal from the transmitter, comparing the unique code of the received signal with a preset code, and producing a control signal when the unique code matches the preset code, the receiver/controller means including an antenna device for receiving the unique code-indicative radio signal by electromagnetic induction and having a first segment susceptible to electromagnetic induction and a second segment having substantially lower impedance than the first segment and coupled with the first segment for generating a magnetic field of sufficient intensity to cause electromagnetic induction, thereby transmitting the demand-indicative radio signal to the transmitter, and an electrically operable actuator associated with the receiver/controller circuit and with the vehicle device to be operated, and responsive to the control signal to operate the vehicle device to perform a desired operation.

The vehicle device is at least one of a door lock mechanism for locking and unlocking a vehicular door lock, a trunk lid lock mechanism, a window regulator, a steering lock device, an ignition system.

BRIEF DESCRIPTION OF THE DRAWINGS

FIG. 6 is a flowchart of a control program for the transmitter of FIG. 2.

FIG. 7 is a flowchart of a control program for the controller of FIG. 3.

DESCRIPTION OF THE PREFERRED EMBODIMENT

Figure 1:
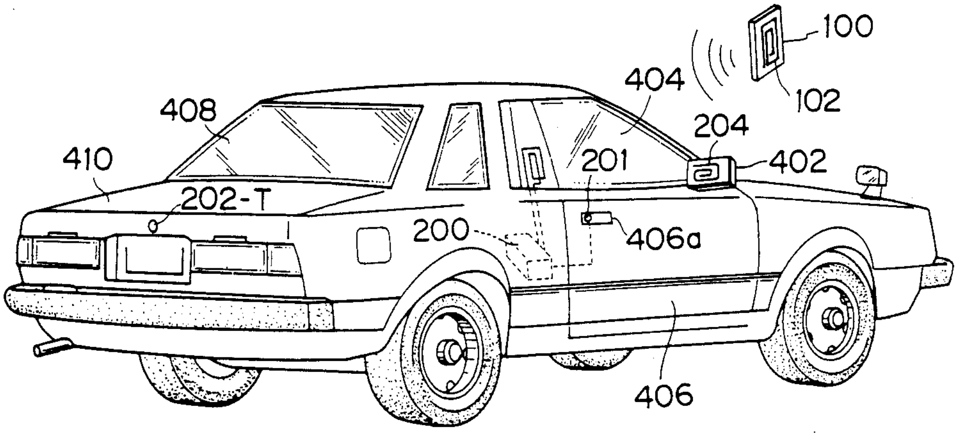
FIG. 1 is a perspective view of a vehicle employing a keyless entry system according to the present invention.

Referring now to the drawings, FIG. 1 shows the preferred embodiment of a keyless entry system according to the present invention applicable to an automotive vehicle. As shown in FIG. 1, the preferred embodiment of the keyless entry system generally comprises a compact wireless transmitter 100 which is comparable in size with common bank or credit cards and so can easily be carried in a clothing pocket. A controller 200 associated with the wireless transmitter 100 is mounted on the vehicle. The controller 200 is connected to a push-button-type manual switch 201 mounted on the external surface of the vehicle body.

In the preferred embodiment, the manual switch 201 is mounted on the vehicle body near a vehicle device 300 to be operated. In order to facilitate keyless operation, the vehicle device is associated with an actuator 302 which is electrically or electromagnetically operable. In the shown embodiment, the keyless entry system is adapted to operate a door lock mechanism, a window regulator, a trunk lid opener, a steering lock mechanism and so forth. As set forth above, in order to operate the exemplary vehicle devices exampled, a plurality of manual switches 201 may be arranged on the vehicle body at positions near the associated vehicle devices.

For example, as shown in FIG. 1, when the vehicle device 300 (see FIG. 3) to be operated by the preferred embodiment of the keyless entry system is the door lock mechanism, a manual switch 201 may be provided on the outside door handle 406*a* of the corresponding vehicular door 406.

The controller 200 is electrically and physically connected to an antenna device 204 which is designed to transmit and receive radio signal to and from the transmitter 100. The preferred construction of the antenna device, which will be described in detail later, enables low-power, long-range radio signal transmission. The antenna device 204 receives the radio signal from the transmitter by electromagnetic induction. Therefore, the antenna device 204 is preferable disposed on the vehicle at a position-near the associated manual switch 201. In the shown embodiment, the antenna device 204 is mounted on a door mirror 402 or a window pane near the manual switch 201 on the outside door handle 406*a*. Similarly, when the vehicle device 300 to be operated by the keyless entry system is a trunk lid opener, the manual switch 201 is mounted on a trunk lid 410 and the antenna device 204 is mounted on a rear window pane 408.

Figure 2:
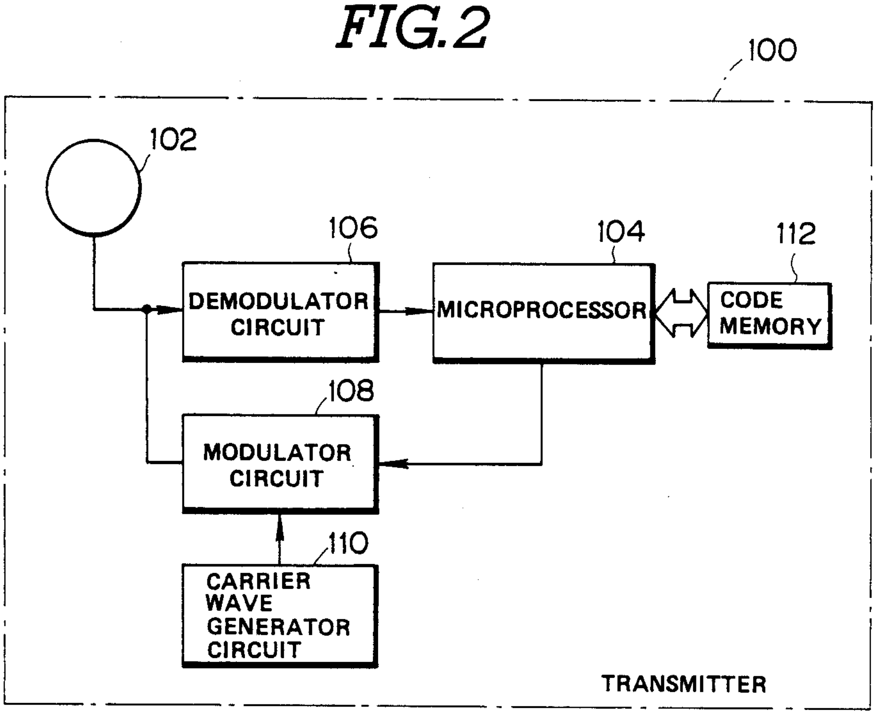
FIG. 2 is a block circuit diagram of a portable transmitter shown in FIG. 1.

FIGS. 2 to 5 show the preferred embodiment of the keyless entry system according to the invention. As shown in FIG. 2, the transmitter 100 comprises a microprocessor 104 for controlling transmission and reception of the radio signals. In practice, the microprocessor 104 may comprise a single-chip processor housed in a relatively thin pocket-portable transmitter casing 100*a*. The microprocessor 104 is connected to an antenna 102. The antenna 102 is in practice printed on the outer surface of the transmitter casing and consists of a loop antenna.

The microprocessor 104 is connected to the antenna 102 for input through a demodulator 106 and for output through a modulator 108. The demodulator 106 receives radio signals received through the antenna and demodulates the radio signal by removing the carrier wave component of the received radio signal. In order to adapt the received signal for application to the digital processor 104, the demodulator 106 outputs a binary coded signal to the microprocessor.

The modulator 108 is also connected to a carrier wave generator 110 for use in generating a radio signal to be transmitted through the antenna 104. The radio signal to be transmitted by the transmitter 100 may contain data indicative of an unique code identifying the transmitter. In order to enable identification of the transmitter and distinguish each specific transmitter from all other transmitters, each transmitter has a unique code. The unique code is stored in a code memory 112 associated with the microprocessor 104. Therefore, when the unique code indicative radio signal is to be transmitted, the microprocessor 104 reads out the unique code from the code memory 112. The microprocessor 104 outputs a signal indicative of the unique code to the modulator 108, The modulator modulates the unique code indicative signal from the microprocessor 104 with the carrier wave from the carrier wave generator circuit 110 to generate the unique code containing radio signal.

Figure 3:
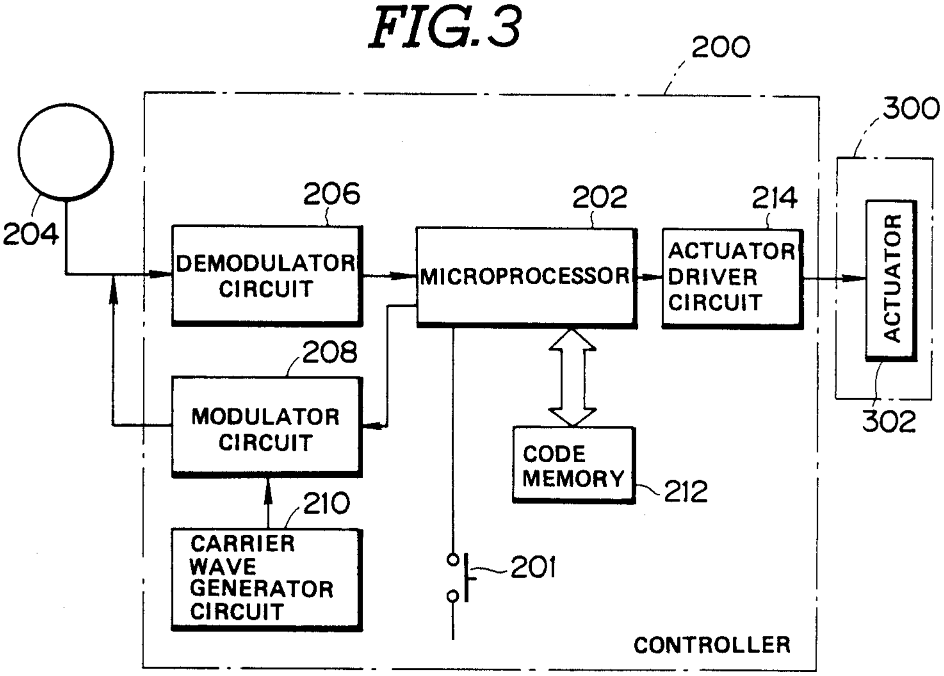
FIG. 3 is a block circuit diagram of a controller and associated elements shown in FIG. 1.

As shown in FIG. 3, the controller 200 also comprises a microprocessor 202 associated with a code memory 212. The microprocessor 202 is connected to the antenna device 204 via a demodulator 206 and via a modulator 208. The demodulator 206 receives the unique code-containing radio signal through the antenna device 204 and converts the received signal into binary code signals indicative of any and all digits encoded in the signal after removing of the carrier wave component from the received radio signal. The demodulator 206 thus outputs to the microprocessor 202 a signal representative of the unique code contained in the radio signal from the transmitter. The microprocessor 202 compares the received unique code with a preset code stored in a code memory 212 and outputs a control signal to an actuator driver circuit 214 to activate the latter when the unique code matches the preset code. When activated the actuator driver circuit 214 operates the actuator 302 of the vehicle device 300.

On the other hand, the microprocessor 202 is also connected to the manual switch 201. In response to depression of the manual switch 201, the microprocessor 202 becomes active to transmit a demand signal for activating the transmitter 100 to perform the aforementioned radio signal transmission. The demand signal is transmitted through the antenna device 204.

Figure 4:
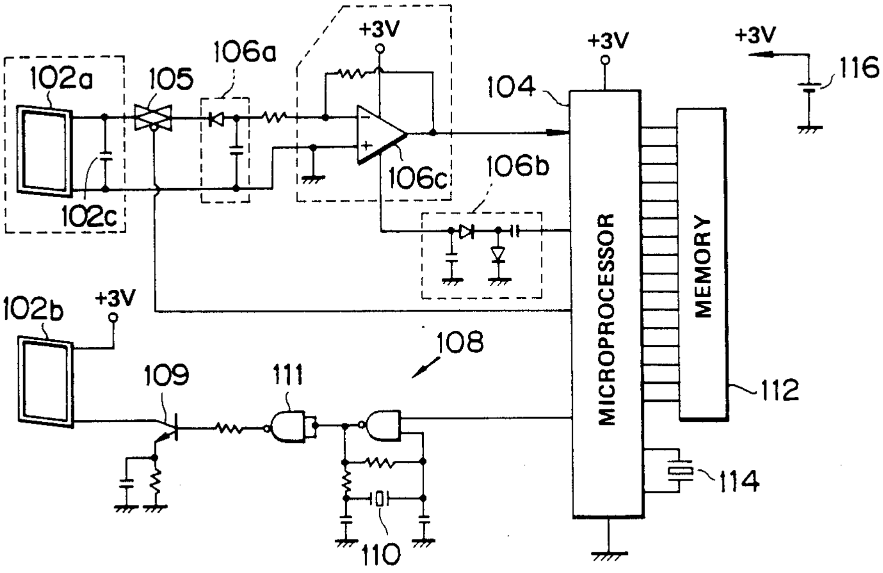
FIG. 4 is a schematic diagram of a preferred embodiment of the portable transmitter.

In practice, the transmitter 100 is provided with a pair of loop antennas 102*a* and 102*b* which are printed on the outer surfaces of the transmitter casing, as shown in FIG. 4. The antenna 102*a* is connected to the receiver circuit 104 and serves as a receiver antenna. On the other hand, the antenna 102*b* is connected to the modulator 108 and serves as a transmitter antenna. A capacitor 102*c* is connected in parallel across the receiver antenna 102*a* to form a passive antenna circuit. The antenna circuit captures by electromagnetic induction the demand signal from the controller 200 produced in response to depression of one of the manual switches 202.

The antenna circuit is connected to a microprocessor 104 via an analog switch 105, a detector circuit 106*a* and an amplifier 106*c*. A negative power supply circuit 106*d* is inserted between an output terminal of the microprocessor 104 and the amplifier 106*c* to invert a corresponding 0 or +3V binary pulse output from the microprocessor into a 0 to −3V input to the amplifier. This negative power is supplied to the amplifier to adjust the bias point of the amplifier to 0V.

The microprocessor 104 is connected to the memory 112 storing the preset unique code. In practice, the memory stores four predetermined, four-bit, BCD digits. The memory 112 can be a ROM pre-masked with the preset code. However, in order to minimize the cost, it would be advantageous to use a circuit in the form of a printed circuit board including circuit elements corresponding to each bit. When the circuit element is connected, it is indicative of "1" and when the circuit element is cut or disconnected, it is indicative of "0". By this arrangement, the preset code may be input simply to the microprocessor 104.

The microprocessor 104 is triggered by the demand signal from the controller 200, by inputs to the microprocessor 104 through the antenna 102*a*, the analog switch 105, the detector circuit 106*a* and the amplifier 106*c*. In response to this trigger signal, the microprocessor 104 reads the preset unique code from the memory 112 and sends a serial pulse-form unique code signal indicative of the unique code to the modulator 108. The modulator 108 includes a crystal oscillator 110 which generates a carrier wave for the unique code signal. The modulator 108 superimposes the unique code signal on the carrier wave to form a radio signal in which the unique code signal rides on the carrier wave. The modulated radio signal is output through a buffer 111, a high-speed transistor 109 and the transmitter antenna 102*b*.

Another crystal oscillator 114 is connected to the microprocessor 104. The oscillator 114 serves as a clock generator which sends clock pulses to the microprocessor.

In the above arrangement of the transmitter, electric power is supplied to all of the components by a small, long-life-type lithium cell 116 such as are used in electronic watches. The microcomputer to be used in the transmitter 100 is of the low-voltage CMOS type. The analog switch 105 and the amplifier 106*c* IC units are also chosen to be of the low-power-consumption type. As a result, stand-by operation requires only about 4 to 5 mA. This means that the transmitter 100 can be used for about one year before replacing the lithium battery.

Figure 5:
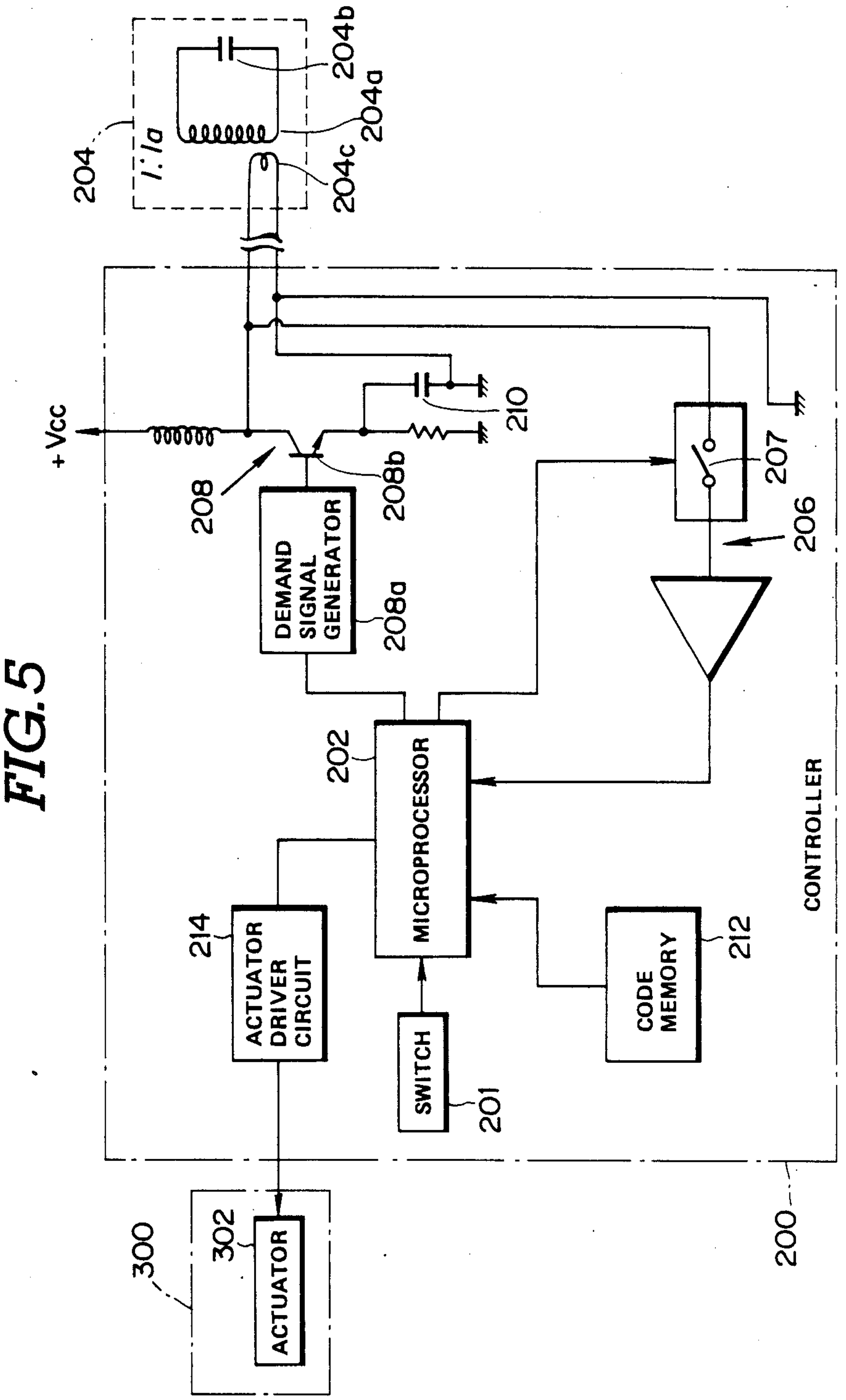
FIG. 5 is a schematic diagram of a preferred embodiment of the controller.
Figure 8:
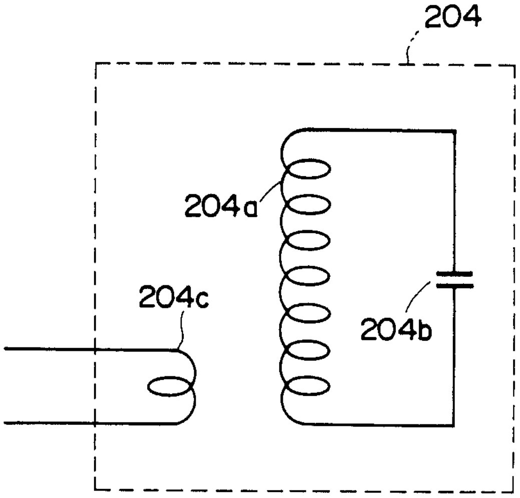
FIG. 8 is a diagram of the antenna of the controller of FIG. 5.

FIG. 5 shows the practical circuitry of the controller 200. As seen from FIG. 5, the antenna device 204 comprises a first loop coil 204*a* and a second loop coil 204*c*. The first loop coil 204*a* is connected to a capacitor 204*b* to form a closed passive antenna circuit. The passive antenna circuit consisting of the first loop coil 204*a*and the capacitor 204*b* generates an electric current at an amplitude corresponding to the intensity of received radio signals, is also designed to transmit radio signals serving as the demand signal to the transmitter to activate the latter. The second loop coil 204*c* serves as part of a transformer and is connected to the transmitter/-receiver circuit of the controller 200.

In practice, the second loop coil 204*c* is connected both of the modulator 208 and the demodulator 206. The modulator 208 comprises a demand signal generator 208*a* and a transistor 208*b*. The modulator 208 is also connected to a crystal oscillator serving as the carrier wave generator 210. The modulator 208 is responsive to HIGH-level signals from the microprocessor 202 output in response to manual operation of the manual switch 201. The demand signal generator 208*a* then is activated to output the demand signal through the antenna device 204 to the transmitter 100.

On the other hand, the demodulator 206 comprises an analog switch 207 connected to the microprocessor 202 which connects and disconnects the demodulator 206 to and from the antenna device. In practice, the microprocessor 202 normally switches the analog switch 207 to a position in which it disconnects the demodulator 206 from the antenna. After a certain delay time after outputting the HIGH level output for triggering the demand signal generator 208*a*, the microprocessor 202 outputs a switching signal to the analog switch to switch it so as to connect the demodulator 206 to the antenna device 204 and thereby enable reception of the unique code signal from the transmitter 100. The microprocessor 202 may hold the switch 207 in the latter switch position for a predetermined period of time. After expiration of the predetermined period of time, the microprocessor 202 switches the switch 207 back to the normal switch position in which the demodulator 206 is disconnected from the antenna device 204.

The operation of the transmitter 100 and the controller 200 will be described herebelow with reference to the flowchart in FIGS. 6 and 7.

FIG. 6 illustrates the operation of the transmitter 100 in the form of a flowchart for a program executed by the microprocessor 104. The microprocessor 104 repeatedly executes the program of FIG. 6. An initial block 1002 checks for reception of the demand signal SDM. Execution of the block 1002 loops until the demand signal SDM is received through the antenna 102. Upon receipt of the demand signal SDM at the block 1002, control passes to a block 1004. In the block 1004, the preset unique code is read from the code memory 112. At a block 1006, a carrier wave produced by a carrier-wave generator 110 is modulated by the unique code signal generator in accordance with the retrieved code to produce the unique code signal. The modulated unique code signal SCD is then transmitted through the antenna 102 to the controller 200 mounted on the vehicle. As set forth above, according to the shown embodiment, the transmitter 100 is designed to consume minimal electric power, particularly during stand-by operation at the block 1002. This minimizes the drain on the battery and thus prolongs its life.

FIG. 7 shows a control program to be executed by the microprocessor 202 of the controller 200. At an initial stage of execution of the second sub-routine, a disabling flag $FL_{DSEB}$ is checked at a block 2002, which disabling flag is set in a flag register in the CPU when the controller 200 is disabled and is reset as long as the controller is enabled. If the disabling flag $FL_{DSEB}$ is set when checked at the block 2002, the routine ends immediately and control returns to the main program.

On the other hand, if the disabling flag $FL_{DSEB}$ is reset when checked at the block 2002, the presence of an ignition key (mechanical key) in the key cylinder (not shown) is checked for at a block 2004. In practice, the presence of the ignition key in the key cylinder is indicated by a high-level input at an input terminal connected to the ignition key switch. If the input level at the input terminal connected to the ignition key switch is high, indicating that the ignition key is in the key cylinder, the user is judged to be in the vehicle. In this case, keyless entry is not to be performed and thus, control returns directly to the control program.

In the absence of the ignition key from the key cylinder the demand signal $S_{DM}$ is transmitted at a block 2006 in substantially the same manner as described with respect to the block 1002. As set forth above, the transmission of the demand signal $S_{DM}$ continues for a predetermined period of time. The period for which the controller 200 remains in transmitter mode is defined by a timer in the microprocessor 202. After the predetermined period of time expires, the output level is changed from low to high. As a result, electrical communication between the switching circuit and the modulator is blocked and the switching circuit establishes electrical communication between the demodulator 206 and the latter. This switching procedure for switching the operation mode of the controller 200 may also be used in the sub-routine of FIG. 6.

After switching the operation mode of the controller from transmitter mode to receiver mode, reception of the unique code signal $S_{CD}$ from the transmitter is checked for at a block 2008. This block 2008 is repeated until the unique code signal $S_{CD}$ is received.

In practice, if the unique code signal $S_{CD}$ is not received within a given waiting period, the keyless entry system would be reset to prevent endless looping. In this case, a theft-preventive counter may be incremented by one and an alarm may be produced when the counter value reaches a given value. This alarm procedure has been disclosed in the aforementioned co-pending U.S. patent application No. 651,782 filed on Sept. 18, 1984. This reception-mode time limit procedure should, in practice, be applied to all routines which await reception of the unique code-indicative signal $S_{CD}$ from transmitter 100.

Upon reception of the unique code signal $S_{CD}$ at the block 2008, the preset code is retrieved from the code memory 212, a block 2010. The received unique code is compared with the preset code at a block 2012. If the unique code does not match the preset code when compared in the block 2012, then the theft-preventing counter may be incremented by one as set forth above and control returns to the main program. On the other hand, if the unique code matches the preset code, then the door is checked to see if it is locked or unlocked at a block 2014. If the door is locked, the control signal is then sent to the actuator 302 to operate the actuator in the unlocking direction, at a block 2016. After this block 2016, the controller returns to the stand-by state. On the other hand, if the door is unlocked when checked at the block 2014, then the actuator 302 is energized at a block 2018 so as to lock the door.

After execution of block 2018, the controller returns to the stand-by state.

In the keyless entry system as set forth above, radio communication between the transmitter 100 and the controller 200 is performed by electromagnetic induction. Electromagnetic induction occurs between the loop antenna 102 and the antenna device 204.

In practice, the preferred embodiment of the keyless entry system employs AM radio signals for radio communication between the transmitter 100 and the controller 200. Amplitude modulation of the demand signal and the unique code signal is performed by the modulators 108 and 208 on the carrier waves from the carrier wave generators 110 and 210.

It would be appreciated that, in order to prolong the life of the battery in the transmitter 100, it would be preferable not to couple a high-frequency amplifier to the antenna 102. Therefore, in the shown embodiment, as shown in FIG. 4, the antenna 102 is directly connected to the detector circuit 106a which is followed by the low-frequency amplifier making up part of the demodulator 106b. In this arrangement of the transmitter, a relatively high-intensity radio signal from the controller 200 is required to ensure radio transmission. Specifically, to enable the detector circuit 106a to detect the demand signal, a magnetic field intensity as high as 120 dBμ/m after conversion into voltage would be needed.

The magnetic field intensity is given by the following equation:

$$E = nH = 120\ \pi H$$

where

H is the intensity of the induced magnetic field; and
E is the field strength.

In cases where the vehicle device to be operated is a door lock, the first and second loop coils 204a and 204b can be mounted on a door window sash, the seat back of a vehicular seat, the door mirror housing or the like. In the preferred embodiment, the first and second loop coils 204a and 204b are mounted on the reflector surface of the door mirror 402, as shown in FIG. 1. In this case, a sufficiently intense magnetic field, e.g. 120 dBμ/mm, within 2m of the door mirror 402 is required for satisfactory radio transmission.

The magnetic field generated by the loop antenna can be expressed. . .

$$E = 120\pi H = (120\pi A \times I \times N)/2\pi X^3 = 60AIN/X^3$$

Where

E: electric field (V/m)

A: area of loop ($m^2$)

I: loop current (A)

N: number of loop turns

X: distance from loop antenna (m)

Assuming the area A of the reflector surface of the door mirror is approximately $0.01m^2$, the distance X is 2m and the electric field strength is 120 dBμ/m = 1 V/m, the foregoing equation yields. . .

$$IN = EX^3/60A = 13.3 \text{ amp-turns}$$

As will be appreciated from this equation, in order to obtain an electric field strength of 120 dBμ/m, the product of the loop current A and the number of loop turns must be 13.3 amp-turns. Taking into account the range of area available for the loop antenna, in general 10 to 20 amp-turns will be necessary.

However, if the number of loop turns is excessively increased in order to reduce the required loop current, the self-resonating frequency of the loop may fall within the frequency range used for radio transmission. This would lower the gain Q of the loop coil; in other words, this would lower the efficiency of the antenna. This limits the number of loop turns in the antenna.

When the carrier wave frequency is in the range of 400 KHz to 500 KHz, the preferred number of the loop turns is about 10. As a result, a loop current of about 1A to 2A would be necessary to generate a sufficiently intense electromagnetic field.

In order to obtain sufficient loop current, the preferred embodiment of the antenna device 204 is provided with the first loop coil 204a serving as the nna loop and a second loop coil 204c designed for impedance conversion. As mentioned previously, the first loop coil 204a is part of a closed loop circuit with the capacitor 204b for parallel resonance.

Figure 9:
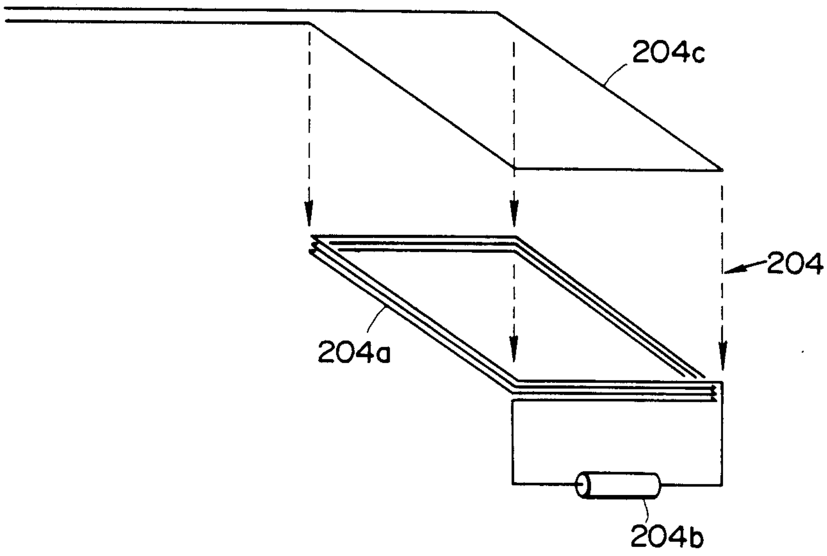
FIG. 9 is a diagrammatic perspective view of a preferred structure of the antenna of FIG. 8.

As shown in FIG. 9, in the practical arrangement, the first and second loops 204a and 204c overlap each other on the reflector surface of the door mirror 402. Thus, the first and second loop coils 204a and 204c are coupled by induction. The number of turns of the second loop coil 204c is significantly smaller than that of the first loop coil 204a. In the preferred construction, the ratio of turns of the first and second loop coils 204a and 204c is approximately 10 : 1, in order to provide the second loop coil a substantially lower impedance than the first loop coil.

The load impedance $Z_L$ when receiving radio signals can be expressed as . . .

$$Z_L = (kN_1/N_2)^2 \times Z_0$$

Where $Z_0$: resonance impedance;

$N_1$: primary winding (second loop coil);

$N_2$: secondary winding (first loop coil); and k: coupling coefficient

Assuming a hollow coil, the value k is about 0.5. Therefore, assuming $N_1=1$, $N_2=10$, $k=0.45$, and $Z_0=3$ KΩ, the load impedance $Z_L$ would be 6Ω. This enables impedance matching with a transistor with an output impedance of $R_c=6Ω$.

All of the radio power is exhausted by the resistance R of the antenna. Therefore, the current value I flowing through the antenna can be expressed . . .

$$RI^2 = P_0 = 12W$$

$$I/\overline{P_0/R} = 2A$$

As will be appreciated herefrom, the preferred construction of the antenna device 204 achieves a sufficiently high loop current and thereby ensures relatively low-sensitivity radio communication between the transmitter and the controller while limitting power consumption.

Figure 10:
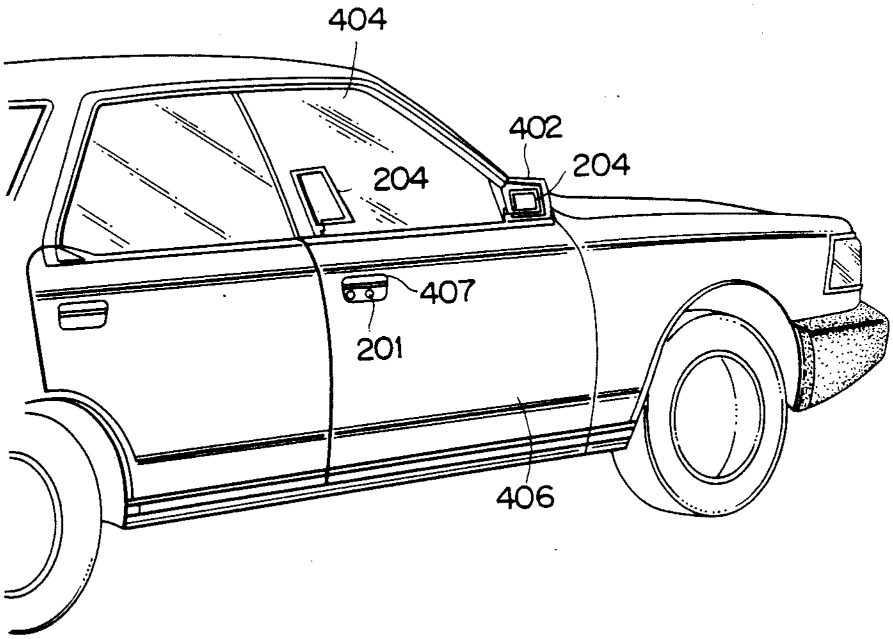
FIGS. 10, 11 and 12 show the antenna of FIG. 8 as installed at various points on the vehicle.
Figure 11:
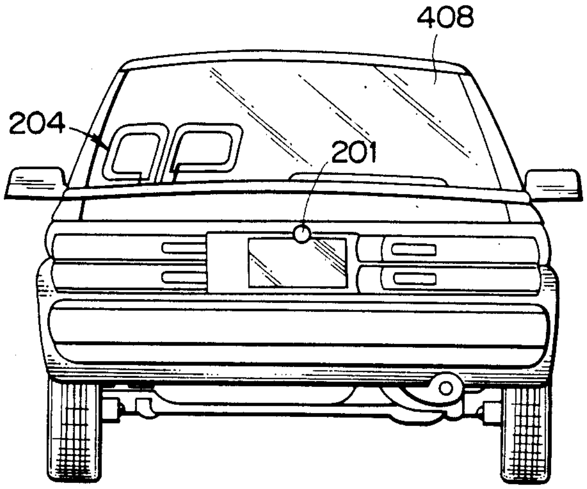
Figure 12:
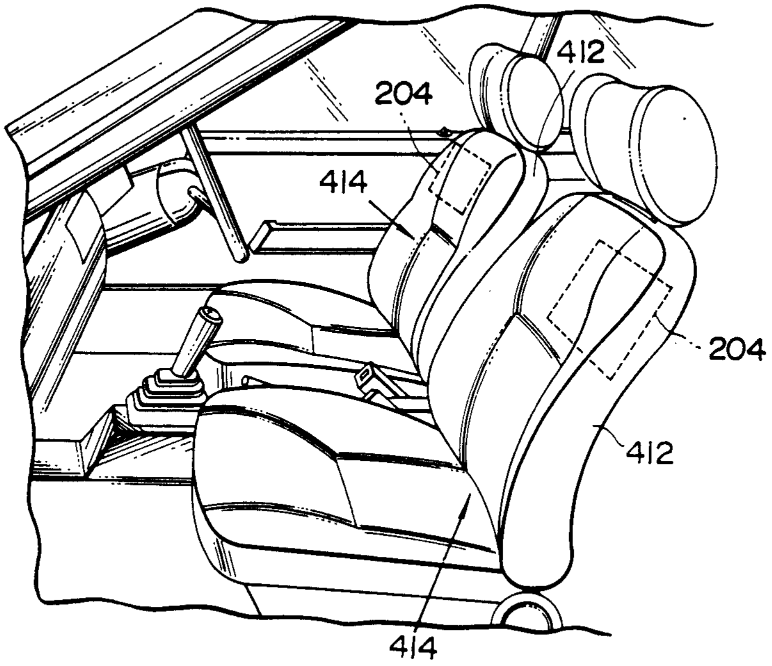

FIGS. 10 to 12 show the antenna devices 204 disposed in various positions. In the example shown in FIG. 10, the first and second loop coils of the antenna device 204 are printed on the door window pane 404. The antenna device 204 in this example is located near the outside door handle 407 on which the manual switch 201 is provided.

FIG. 11 shows another example, in which the antenna device 204 is installed on the rear window pane 408. This arrangement is especially suitable when the vehicle device 300 to be operated by the keyless entry system is a trunk lid lock or a trunk lid opener. In this case, the manual switch 201 is provided on the trunk lid 409. FIG. 12 is shows a further example, in which the antenna device 204 is imbedded in a seat back 412 of the vehicular seat 414. In this case, the antenna device 204 is associated with the manual switch on the outside door handle.

It should be noted that although a specific embodiment of the keyless entry system has been disclosed hereabove in order to facilitate full understanding, the present invention is applicable to various arrangements and operations of relevant keyless entry systems which employ radio signals for controlling vehicle devices. For example, the copending U.S. patent applications Ser. No. 651,782, filed on Sept. 18, 1984, Ser. No. 651,783, filed on Sept. 18, 1984, Ser. No. 651,784, filed on Sept. 18, 1984, Ser. No. 651,785, filed on Sept. 18, 1984, Ser. No. 654,219, filed on Sept. 25, 1984, Ser. No. 675,629, filed on Nov. 28, 1984, Ser. No. 675,649, filed on Nov. 28, 1984, Ser. No. 706,281, filed on Feb. 27, 1985, and Ser. No. 721,868, filed on Apr. 10, 1985, which all have been assigned to the common owner to the present invention, disclose relevant keyless entry systems, to which the present invention is applicable. The contents of these co-pending U.S. patent applications are hereby incorporated by reference.

What is claimed is:

1. A keyless entry system comprising:

a manual switch;

a pocket-portable transmitter transmitting a radio signal indicative of an unique code which identifies the transmitter, in response to a demand in the form of a radio signal;

a receiver/controller means transmitting a demand indicative radio signal to said transmitter in response to operation of said manual switch, receiving said unique code-indicative radio signal from said transmitter, comparing said unique code indicated by the received signal with a preset code, and producing a control signal when said unique code matches said preset code, said receiver/controller means including an antenna device for receiving said unique code-indicative radio signal by electromagnetic induction and having a first segment susceptible to electromagnetic induction and a second segment having substantially lower impedance than said first segment and inductively coupled with said first segment for generating a magnetic field sufficiently intense to cause electromagnetic induction and to transmit said demand indicative radio signal to said transmitter; and an electrically operable actuator associated with said receiver/controller circuit and with an object device to be operated, and responsive to said control signal to operate said object device to perform a desired operation.

2. A keyless entry system as set forth in claim 1, wherein said first and second segments comprise first and second loop coils, which second loop coil has substantially fewer turns than said first loop coil.

3. A keyless entry system as set forth in claim 2, wherein said antenna device is adapted to generate a magnetic field at a strength of 120 dBρ/m within an area of not more than 2m from the antenna device.

4. A keyless entry system as set forth in claim 3, wherein said second loop coil has one-tenth the number of turns of said first loop coil.

5. A keyless entry system as set forth in claim 1 wherein said pocket portable transmitter includes a battery power supply.

6. A keyless entry system as set forth in claim 2 wherein said first loop coil is connected to a capacitor to form a closed passive antenna circuit and said second loop is connected to said receiver/controller means.

7. A keyless entry system as set forth in claim 6 wherein said first and second loops comprise a transformer.

8. A keyless entry system as set forth in claim 1 wherein said receiver/controller means includes a demand signal generator circuit coupled to said antenna device for generating said demand indicative radio signal, a demodulator circuit for demodulating said unique code-indicative radio signal, and switching means for selectively connecting said demodulator circuit to said antenna device.

9. A keyless entry system as set forth in claim 7 wherein said receiver/controller means further includes a processor that controls said switching means to disconnect said demodulator circuit from said antenna device when said demand signal generator circuit is generating said demand indicative radio signal.

10. A keyless entry system for operating an automotive vehicle devices, comprising:

a manual switch mounted on an external surface of the vehicle body and accessible from outside the vehicle a pocket-portable transmitter, to be carried by a user of the vehicle, for transmitting a radio signal indicative of an unique code which identifies the transmitter in response to a demand in the form of a radio signal;

a receiver/controller means, mounted on the vehicle and electrically connected to said manual switch, for transmitting a demand-indicative radio signal to said transmitter in response to manual operation of said manual switch, receiving said unique code-indicative radio signal from said transmitter, comparing said unique code of the received signal with a preset code, and producing a control signal when said unique code matches said preset code, said receiver/controller means including an antenna device for receiving said unique code-indicative radio signal by electromagnetic induction and having a first segment susceptible to electromagnetic induction and a second segment having substantially lower impedance than said first segment and inductively coupled with said first segment for generating a magnetic field of sufficient intensity to cause electromagnetic induction, thereby transmitting said demand-indicative radio signal to said transmitter; and an electrically operable actuator associated with said receiver/controller circuit and with said vehicle device to be operated, and responsive to said control signal to operate said vehicle device to perform a desired operation.

11. A keyless entry system as set forth in claim 10, wherein said first and second segments comprise first and second loop coils, which second loop coil has substantially fewer turns than said first loop coil.

12. A keyless entry system as set forth in claim 11, wherein said first and second loop coils are coupled by inductive coupling.

13. A keyless entry system as set forth in claim 12, wherein said antenna device is adapted to generate a magnetic field at a strength of 120 dBμ/m within an area of not more than 2m from the antenna device.

14. A keyless entry system as set forth in claim 13, wherein said second loop coil has one-tenth the number of turns of said first loop coil.

15. A keyless entry system as set forth in claim 12, wherein said vehicle device is a door lock mechanism for locking and unlocking a vehicular door lock.

16. A keyless entry system as set forth in claim 12, wherein said vehicle device is a trunk lid lock mechanism.

17. A keyless entry system as set forth in claim 12, wherein said vehicle device is a window regulator.

18. A keyless entry system as set forth in claim 12, wherein said vehicle device is a steering lock device.

19. A keyless entry system as set forth in claim 12, wherein said vehicle device is a starter for an vehicular engine.

* * * * *